United States Patent [19]

Romano et al.

[11] Patent Number: 5,598,966
[45] Date of Patent: Feb. 4, 1997

[54] BRAZED LOWER VACUUM HOUSING FOR A DEWAR

[75] Inventors: Timothy S. Romano; Tom K. Evans; Gary B. Hughes, all of Goleta; Karl H. Neumann, Santa Barbara, all of Calif.

[73] Assignee: Santa Barbara Research Center, Goleta, Calif.

[21] Appl. No.: 277,458

[22] Filed: Jul. 19, 1994

[51] Int. Cl.⁶ .................................................. B23K 1/19
[52] U.S. Cl. ....................... 228/124.6; 228/175; 228/184
[58] Field of Search ............................. 228/122.1, 124.5, 228/124.6, 175, 184, 187, 226

[56] References Cited

U.S. PATENT DOCUMENTS 4,645,931  2/1987  Gordon et al. .......................... 250/352
5,131,582  7/1992  Kaplan et al. .......................... 228/121
5,198,671  3/1993  Hatch et al. ............................ 250/352

OTHER PUBLICATIONS

Welding Journal, "Joining Ceramic to Metal with Ductile Active Filler Metal", Mizuhara and Huebel, pp. 43–51, Oct. 1986.

*Primary Examiner*—Samuel M. Heinrich
*Attorney, Agent, or Firm*—W. C. Schubert; W. K. Denson-Low

[57] ABSTRACT

A lower vacuum housing (34) of a sensor dewar (26) is fabricated in a single brazing operation from ceramic and metallic components. The components are assembled with ceramic-to-metal interfaces and metal-to-metal interfaces. Brazing is accomplished by active brazing of the ceramic-to-metal interfaces and non-active brazing of the metal-to-metal interfaces. Specific combinations of active braze alloys and non-active braze alloys are provided for various combinations of dewar materials.

15 Claims, 1 Drawing Sheet

5,598,966

BRAZED LOWER VACUUM HOUSING FOR A DEWAR

BACKGROUND OF THE INVENTION

This invention relates to apparatus for maintaining a low-temperature environment, and, more particularly, to an improved construction for a vacuum package dewar.

Many types of electronic devices operate most efficiently at reduced temperatures. For example, infrared sensors using focal plane array, charge-coupled device must be operated at a temperature of 77K. or less. Cooling of the sensor elements is accomplished by placing the focal plane array into an evacuated enclosure having an infrared-transmissive window. The sensor within the enclosure, termed a vacuum package or dewar, is cooled to the required reduced temperature by cryogenic gas cooling, Joule-Thomson cooling, thermoelectric cooling, or other operable technique. The vacuum enclosure prevents heat from the surroundings from being conducted to the sensor to warm it at a rate faster than heat can be removed by the cooling apparatus. The present invention relates to the construction of the dewar and the method of its fabrication.

In the conventional practice, the dewar is formed of a two-part housing. An upper vacuum housing includes the infrared-transmissive window, and a lower vacuum housing contains the focal plane array sensor, its support that provides the conductive heat path to the cooling apparatus, and related structure. During assembly of the instrument, the support structure and sensor are installed within the lower vacuum housing, and electrical connections are made to feedthroughs built into the wall of the lower vacuum housing. The sensor is installed in the lower vacuum housing, and the upper vacuum housing is fixed to a flange on the lower vacuum housing. The interior of the device is evacuated and sealed off to complete the fabrication process.

The present invention relates to the manner of construction of the lower vacuum housing, prior to the above-described assembly steps, and to the resulting dewar. The lower vacuum housing is usually prepared by first building a number of subassemblies and joining the subassemblies together. Thus, typically, an outer housing, a coldfinger tube, an adaptor collar, a platform, a ceramic insulator, electrical feedthrough leads, a flange, and a header are fabricated. The coldfinger tube and the adaptor collar are welded or soldered together. A tip-off tube is welded to the flange. The feedthrough leads are brazed to the ceramic insulator. The ceramic insulator is brazed to an opening in the outer housing. The header and flange are welded to the outer housing. The coldfinger tube/adaptor collar is welded to the outer housing. All of these assembly steps require separate joining operations, separate inspections and tests, and the tracking of the various subassemblies through the joining operations.

This approach, while effective in producing an operable lower vacuum housing suitable to receive the focal plane array of the sensor, has some drawbacks. First, the many subassembly and assembly steps are time consuming and costly. Welding procedures in particular require extensive setup and care in positioning the parts, even when automated procedures are used. Second, there may be reliability problems resulting from the many types of joints and procedures utilized. Third, these joining operations and the order in which they are performed dictate the material types which can be used for the various components, which sometimes leads to less than optimal choices for the materials.

There is a need for an improved approach to the fabrication of such dewar structures, which reduces the cost and improves the reliability of the final structure, and permits wider flexibility in the selection in materials used in the components. The present invention fulfills this need, and further provides related advantages.

SUMMARY OF THE INVENTION

This invention provides an improved fabrication procedure for the lower vacuum housing of a dewar system. The procedure permits the joining of all elements of the lower vacuum housing in a single assembly step. The time required and cost of assembly are thereby greatly reduced as compared with the prior approach. The joining technique is rapidly accomplished and is highly reliable, producing a final lower vacuum housing that is highly reliable. A wider range of materials is available for selection for use in the various components of the lower vacuum housing, due to the flexibility of the joining technique.

In this approach, the components of the lower vacuum housing are first furnished. At least some of the components are ceramic and at least some of the components are metallic. The components are assembled together so that the assembly includes at least one ceramic-to-metal interface and at least one metal-to-metal interface, and the assembled components are joined by a single brazing operation.

Preferably, the joint at the ceramic-to-metal interface is formed by active brazing, and the joint at the metal-to-metal interface is formed by non-active brazing. These two techniques are compatible and can be performed concurrently, but require the use of different brazing alloys. Care is taken in selecting the brazing alloys for various material combinations that can be used in the lower vacuum housing.

The present approach significantly reduces the time and cost required to fabricate the lower vacuum housing. Instead of the many separate steps of subassembly preparation and final assembly, all of the components of the lower vacuum housing are assembled to the final structure in a single step. The single-step fabrication is accomplished even though there are both ceramic-to-metal and metal-to-metal joints in the structure. The joints are formed by reliable brazing techniques. The incorporation of active and non-active brazing in a single process step also allows many different metallic and nonmetallic materials to be used in constructing the lower vacuum housing.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
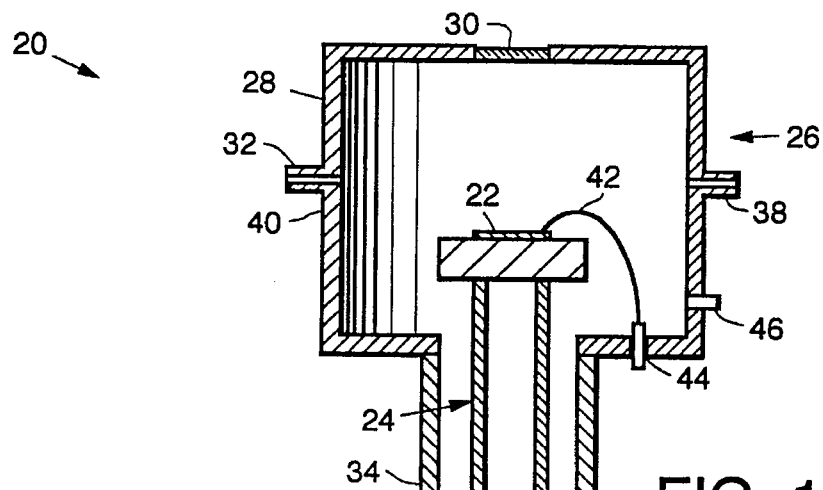
FIG. 1 is a schematic side sectional view of a dewar having a lower vacuum housing, an upper vacuum housing, and a focal plane array sensor therein.

FIG. 1 depicts an infrared-sensor vacuum package assembly 20. The vacuum package assembly 20 includes a focal plane array sensor 22 mounted on a pedestal 24. The pedestal 24 and sensor 22 are fixed within a dewar 26.

The dewar 26 includes two parts that are initially separate and are joined together during final assembly. An upper vacuum housing 28, also termed the window housing, is preferably cylindrically symmetric, although of varying diameters along its length. An infrared-transparent window 30 forms at least a part of one end of the upper vacuum housing 28. An upper flange 32, in this case integral with the body of the upper vacuum housing, is formed at the other end of the upper vacuum housing 28.

A lower vacuum housing 34 is conformably shaped so as to mate with the upper vacuum housing 28. In the preferred embodiment, the lower vacuum housing 34 is cylindrically symmetric and of varying diameters along its length. A bottom end 36 of the lower vacuum housing 34 is closed, with the pedestal 24 mounted to the end 36 such that the sensor 22 is facing the window 30 when the upper vacuum housing 28 is assembled to the lower vacuum housing 34. A lower flange 38 is present at an upper end 40 of the lower vacuum housing 34. The upper flange 32 and the lower flange 88 are dimensioned to permit a vacuum-tight seal between the upper vacuum housing 28 and the lower vacuum housing 34 during final assembly.

During final assembly of the vacuum package assembly 20, the sensor 22 is attached to the upper end of the pedestal 24, and lead wires 42 are attached between the sensor 22 and an electrical feedthrough 44 in the wall of the lower vacuum housing 84. The upper vacuum housing 28 is placed over the lower vacuum housing 34 so that the flanges 32 and 88 are in facing contact, and the edge of the flanges are welded together. The interior of the dewar 26 is evacuated through a tip-off tube 46 in the wall of the lower vacuum housing, and the tip-off tube is sealed. The device is then ready for operation. (Alternatively, the upper vacuum housing 28 can be joined to the lower vacuum housing 34 in an evacuated chamber, and no tip-off tube 46 is required.)

The preceding general description of the vacuum package assembly has focused on a preferred design of interest to the present inventors. There are a wide variety of designs for the vacuum package assembly, and the present invention is applicable to all such designs that use a multi-component lower vacuum housing.

Figure 2:
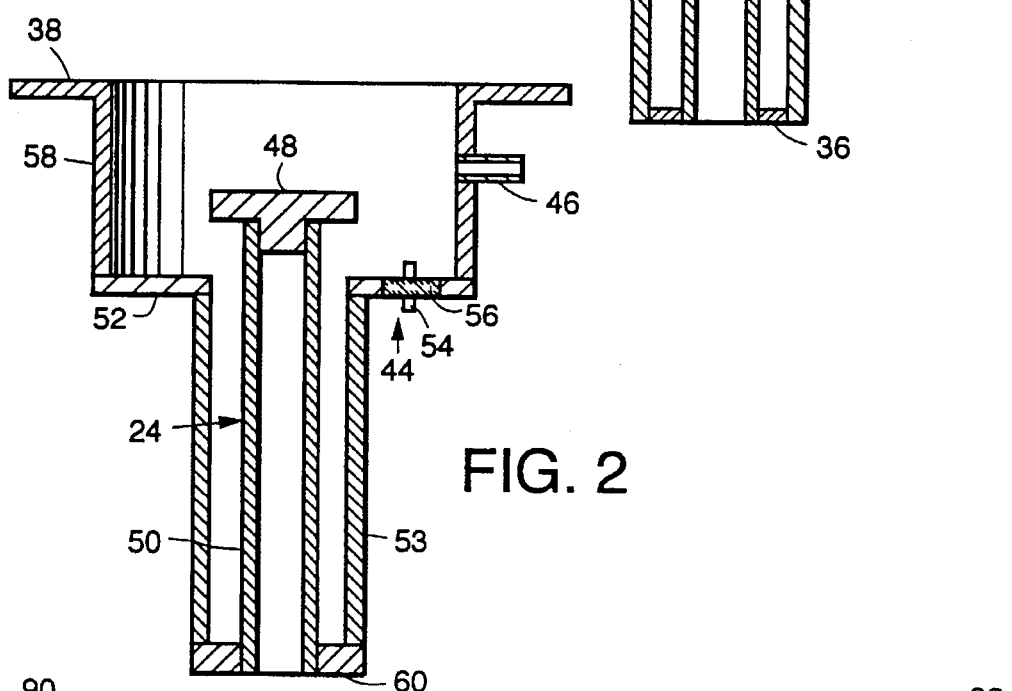
FIG. 2 is a schematic side sectional view of the lower vacuum housing of FIG. 1, with the various components highlighted.

FIG. 2 illustrates the components of the lower vacuum housing 34 in greater detail. These components are separately fabricated and then assembled to form the lower vacuum housing 34, prior to adding the sensor 22 and final assembly with the upper vacuum housing 28. The pedestal 24 is prepared as a platform 48 joined to a coldfinger tube 50. The external wall of the lower vacuum housing has a number of components. A header 52 is joined to an outer tube 53. The feedthrough 44, which is joined to an opening in the header 52, is prepared as an electrically conductive lead 54 penetrating through a ceramic insulator 56. The lower flange 38 is typically prepared integral with a cylindrical section 58, and the tip-off tube 46 is joined to an opening through the wall of the cylindrical section 58. The pedestal 24 is joined to the bottom end 35 of the outer tube 53 with an adaptor collar 60.

As mentioned before, there can be different designs of the lower vacuum housing 34 with more or fewer components, but in general there are multiple components made of different materials used in the construction of the lower vacuum housing 34. Most of the components are preferably made of metal, but there is at least one ceramic component, the insulator 56, in these designs. It is also not uncommon that the header 52 be made of ceramic.

In prior practice, a number of subassemblies are prepared separately and then are assembled together to form the lower vacuum housing 34. The pedestal 24 is prepared as a subassembly and then welded to the adaptor collar 50, which in turn is welded to the outer tube 53. The feedthrough 44 is prepared as a subassembly by brazing the lead 54 to the insulator 56. The insulator 56 is then brazed to the header 52 (where the header is metallic) in another brazing operation. The header 52 is welded to the outer tube 53. The flange 38 is welded to the cylindrical section 58, and the tip-off tube 46 is welded to the cylindrical section 58. The cylindrical section 58 is welded to the header 52. Although the makeup of various subassemblies can vary depending upon the specific design, it is apparent that numerous subassemblies are required, and there are numerous welding and brazing steps required to prepare the lower vacuum housing 34.

In the presently preferred approach, no separate subassemblies are prepared. Instead, the entire lower vacuum housing 34 is prepared in a single step from the individual components. In this approach, the components themselves do not change, but their mode of assembly does change.

Figure 3:
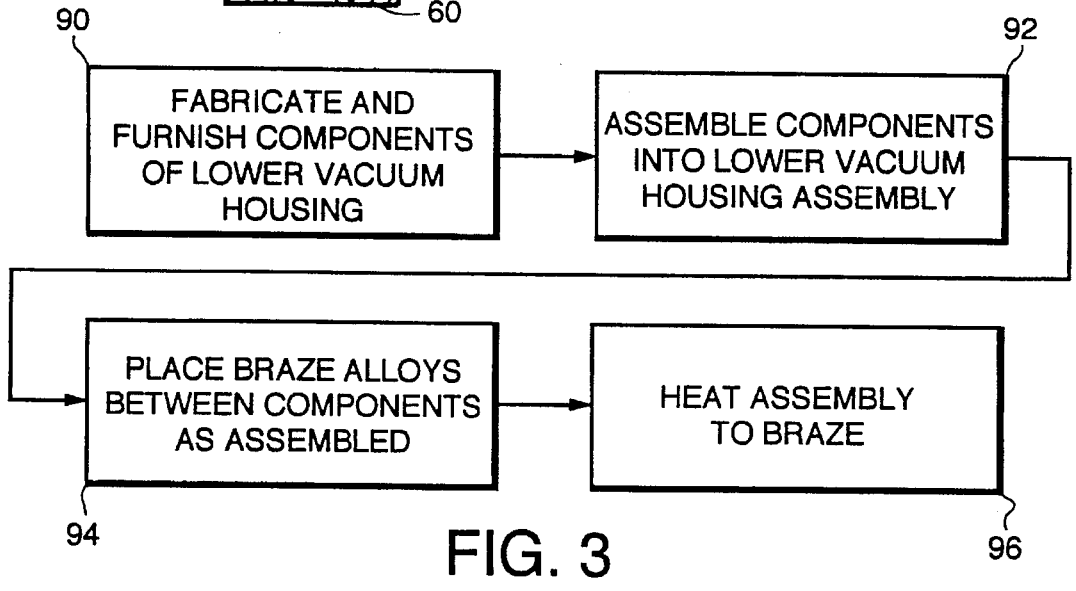
FIG. 3 is a block flow diagram of the method of preparing the lower vacuum housing shown in FIG. 2.

FIG. 3 is a block flow diagram of the method for preparing the lower vacuum housing by the approach of the invention. The components are first fabricated and furnished, numeral 90. The components are generally those described previously, and their equivalents. The components may be made of any operable material. In some cases a component may be made of metal, while in other cases a component may be made of ceramic. Certain components may be made of either a metal or a ceramic, depending upon the particular design of the dewar.

The following listing presents some preferred materials of construction of the various components, although the invention Is not limited to the use of these materials of construction. The platform 48 may be made of aluminum nitride (a ceramic) or invar (an iron-nickel composition). The coldfinger tube 50 may be made of TI-6A1-4V, invar, or inconel (a nickel-base metal). The adaptor collar 60 may be made of kovar (an iron-nickel-cobalt composition) or stainless steel. The outer tube 53 may be made of kovar or stainless steel. The header 52 may be made of kovar, stainless steel, or copper (all metals) or aluminum oxide (a ceramic). The feedthrough lead 54 is a metal such as molybdenum. The feedthrough insulator 56 is a ceramic such as aluminum oxide. The flange 88 and cylindrical section 58 are typically made of the same material as the outer tube 53. The tip-off tube 46 may be made of copper.

Different specific dewar designs may require various combinations of these materials of construction. In each case, however, at least two of the components are metals and at least one of the components is a ceramic. Consequently, at least one metal-to-metal bond is required and at least one ceramic-to-metal bond is required in the final lower vacuum housing 34.

Whatever the materials of construction, the components are assembled into the proper relation to each other to form the lower vacuum housing 34, numeral 92, prior to joining them together. Tooling is typically provided to hold the various components in the proper geometrical relations to each other.

Braze alloys are placed into the interfaces between the components, numeral 94. The braze alloys are usually placed into the interfaces as the components are assembled, so that steps 92 and 94 are accomplished concurrently. The various interfaces in the preferred approach are found between the platform 48 and the coldfinger tube 50, between the coldfinger tube 50 and the adaptor collar 60, between the adaptor collar 50 and the outer tube 53, between the outer tube 53 and the header 52, between the header 52 and the insulator 56, between the insulator 56 and the lead 54, between the header 52 and the cylindrical section 58, and between the cylindrical section 58 and the tip-off tube 46. The nature of each interface depends upon the compositions of the components that face each other at the respective interfaces, but there will be at least one metal-to-metal and one ceramic-to-metal joint. There could be a ceramic-to-ceramic joint, if the header 52 is made of a ceramic.

The metal-to-metal, ceramic-to-metal, and ceramic-to-ceramic (if any) joints corresponding to each interface are formed by brazing, all in the same brazing operation and at the same time. The metal-to-metal joints are preferably formed by non-active brazing, wherein the brazing alloy does not substantially chemically react with either component. The ceramic-to-metal joint(s) and the ceramic-to-ceramic joint(s) are preferably formed by active brazing, wherein the brazing alloy chemically reacts with one or both components to promote wetting of the braze alloy to the component and to attain a metallurgical and chemical bond to the component. Reactive metals such as titanium or zirconium are typically present in the braze alloys to accomplish such reaction. The metal-to-metal joints can also be formed by active brazing. Since active braze materials are typically more expensive and difficult to utilize than non-active braze materials, it is preferred that the metal-to-metal joints be formed by non-active brazing.

Non-active brazing has long been used in metal-to-metal joints. Active brazing is a more recent development, but is now known in the art or brazing. See, for example, H. Mizuhara et al., "Joining Ceramic to Metal with Ductile Active Filler Metal," *Welding Journal*, pages 45–51 (October 1986). However, It has not been known to combine active brazing with non-active brazing to prepare an entire lower vacuum housing made of different materials and having both metal-to-metal joints and ceramic-to-metal joints.

After the braze alloys have been placed into the interfaces, numeral 94, the assembly is heated to a brazing temperature, numeral 96. At that temperature, the various braze materials melt and wet the components that face each other across each respective interface. After wetting and bonding is achieved, which typically requires only 3–15 minutes, the assembly is cooled so that the braze alloys solidify, bonding the components hermetically together. Typical brazing conditions are a vacuum of less than $10^{-5}$ Torr and a heat-up rate of about 55° F. per minute to the brazing temperature. It is preferred to temporarily suspend the heating at about 120° F. below the brazing temperature to permit thermal equilibration, and then to resume heating to the brazing temperature.

The selection of the brazing alloys and the brazing temperature depends upon the specific materials used in the components, which in turn depends upon the specific requirements for a dewar design. Three principal approaches have been identified that are sufficient to permit brazing of any of the materials combinations required for the various compositions of the components that were previously discussed.

In a first approach, where the metallic components are made of iron-nickel, iron-nickel-cobalt, or copper alloys, the brazing temperature is preferably about 1500° F. The preferred non-active braze material used for metal-to-metal joints is copper-silver alloy having a composition of 72 weight percent copper and 28 weight percent silver. Such a braze material is available commercially from Wesgo Corp. under the trade name "Cusil". The preferred active braze material used for ceramic-to-metal joint(s) and ceramic-to-ceramic joint(s) is an alloy of silver, copper, titanium, and tin having a composition of 63 weight percent silver, 34.25 weight percent copper, 1.75 weight percent titanium, and 1.0 weight percent tin. Such a braze material is available commercially from Wesgo Corp. under the trade name "Cusin-1 ABA".

In a second approach, where the metallic components are made of iron-nickel, iron-nickel-cobalt, or copper alloys, together with titanium alloys, the brazing temperature is preferably about 1625° F. The preferred non-active braze material used for metal-to-metal joints is a silver-copper-palladium alloy having a composition of 58 weight percent silver, 32 weight percent copper and 10 weight percent palladium. Such a braze material is available commercially from Wesgo Corp. under the trade name "Palcusil-10". The preferred active braze material used for ceramic-to-metal and ceramic-to-ceramic joints is a silver-copper-titanium alloy having a composition of 68.8 weight percent silver, 26.7 weight percent copper, and 4.5 weight percent titanium. Such a braze material is available commercially from Wesgo Corp. under the trade name "Ticusil".

In a third approach, where 300 or 400 series stainless steels are used in the lower vacuum housing, the brazing temperature is preferably about 1725° F. The preferred non-active braze material used for forming the metal-to-metal joints is a gold-copper-nickel alloy having a composition of 81.5 weight percent gold, 16.5 weight percent copper, and 2.0 weight percent nickel. Such a braze material is available commercially from Wesgo Corp. under the trade name "Nicoro-80". The preferred active braze material used for ceramic-to-metal and ceramic-to-ceramic joints is an alloy of silver, copper, titanium, and aluminum alloy a composition of 92.75 weight percent silver, 5 weight percent copper, 1.25 weight percent titanium, and 1 weight percent aluminum. Such a braze material is available commercially from Wesgo Corp. under the trade name "Silver ABA".

The brazing alloys are not limited to those set forth in the above-described preferred embodiments. However, in all cases the brazing alloys must be compatible in that they must be molten at the brazing temperature selected. They must also be operable to accomplish the desired brazing.

The present approach has been used to prepare several dewars according to the approach described above. After fabrication, the lower vacuum housing were joined to the upper vacuum housings. The completed dewars were evacuated to about $10^{-5}$ to $10^{-6}$ Torr, and tested to be certain that the joints were hermetic. A dewar was Judged to pass the leak check if it had a leak rate of less than $10^{-10}$ standard cubic centimeters of helium per second total for the entire dewar. All dewars passed this initial leak check testing.

To accomplish further testing, electrical isolation tests were first conducted to determine whether the leads 54 of the feedthroughs were electrically isolated with a resistance greater than 1000 megohms at 100 volts DC. All of the fabricated dewars passed this test. The dewars were thereafter thermally cycled between −80° C. and ambient temperature and leak checked to be certain that the joints remained hermetic. All dewars passed this test. The dewars were thereafter thermally cycled between 77K and ambient temperature and leak checked to be certain that the joints remained hermetic. All dewars passed this test. The dewars were thereafter heated to 450° C. for 72 hours, cooled to ambient temperature, and leak checked. All dewars passed this test. The single-step fabrication of the lower vacuum housing was thereby determined to be fully effective at producing an acceptable dewar.

The lower vacuum housings prepared by the approach of the Invention are less expensive and time consuming to produce than those prepared by the prior approach. Additionally, the lower vacuum housing have superior expected reliability to those prepared by the prior approach. The brazed joints have been proven to be more robust in thermal cycling and high-vibration environments than identical welded joints. Moreover, the welded joints are possible only for certain material combinations at the joints, and these combinations may not be the most preferred materials of construction for the lower vacuum housing components. As an example, one cannot weld a ceramic platform to a metal coldfinger. Brazing with the present approach allows for optimal materials selection and also for reliable, robust joints between the selected materials.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a lower vacuum housing of a sensor dewar having an upper vacuum housing and the lower vacuum housing, comprising the steps of:

furnishing the components of the lower vacuum housing, at least some of the components being ceramic and at least some of the components being metallic;

assembling the components together so that the assembly includes at least one ceramic-to-metal interface and at least one metal-to-metal interface; and joining the assembled components by a single brazing operation.

2. The method of claim 1, wherein the step of joining includes the step of brazing the at least one ceramic-to-metal interface by active brazing to form at least one ceramic-to-metal joint.

3. The method of claim 1, wherein the step of joining includes the step of brazing the at least one metal-to-metal interface by non-active brazing to form at least one metal-to-metal joint.

4. The method of claim 1, wherein the step of furnishing the components includes the step of furnishing at least some metallic components made of metals selected from the group consisting of iron-base alloys, nickel-base alloys, and copper-base alloys, and wherein the step of joining includes the step of brazing the at least one metal-to-metal interface with a braze alloy heated to a temperature of about 1500° F.

5. The method of claim 4, wherein the step of brazing the metal-to-metal interfaces further includes the step of furnishing a braze alloy comprising copper and silver.

6. The method of claim 4, wherein the step of joining includes the step of brazing the at least one ceramic-to-metal interface with an active braze alloy comprising silver, copper, titanium, and tin.

7. The method of claim 1, wherein the step of furnishing the components includes the step of furnishing at least some metallic components made of metals selected from the group consisting of iron-base alloys and titanium-base alloys, and wherein the step of joining includes the step of brazing the at least one metal-to-metal interface with a braze alloy heated to a temperature of about 1620° F.

8. The method of claim 7, wherein the step of brazing the metal-to-metal interfaces further includes the step of furnishing a braze alloy comprising silver, copper, and palladium.

9. The method of claim 7, wherein the step of joining includes the step of brazing the at least one ceramic-to-metal interface with an active braze alloy comprising silver, copper, and titanium.

10. The method of claim 1, wherein the step of furnishing the components includes the step of furnishing at least some metallic components made of stainless steel, and wherein the step of joining includes the step of brazing the at least one metal-to-metal interface with a braze alloy heated to a temperature of about 1725° F.

11. The method of claim 10, wherein the step of brazing the metal to metal interfaces further includes the step of furnishing a braze alloy comprising gold, copper, and nickel.

12. The method of claim 10, wherein the step of joining includes the step of brazing the at least one ceramic-to-metal interface with an active braze alloy comprising silver, copper, titanium, and aluminum.

13. A method for preparing a lower vacuum housing of a sensor dewar having an upper vacuum housing and the lower vacuum housing, comprising the steps of:

furnishing the components of the lower vacuum housing, at least some of the components being ceramic and at least some of the components being metallic;

assembling the components together so that the assembly includes at least one metal-to-metal interface and at least one ceramic-to-metal interface; and joining the assembled components, the step of joining including the steps of forming at least one metal-to-metal joint by non-active brazing of the at least one metal-to-metal interface, and forming at least one ceramic-to-metal joint by active brazing of the at least one ceramic-to-metal interface.

14. The method of claim 13, wherein the step of forming at least one ceramic-to-metal joint includes the step of providing an active braze alloy containing titanium.

15. The method of claim 13, wherein the step of forming at least one metal-to-metal joint includes the step of providing a non-active braze alloy containing at least 50 percent by weight of a metal selected from the group consisting of copper, silver, and gold.

* * * * *